United States Patent Office 3,324,125
Patented June 6, 1967

3,324,125
BARBITURIC ACID DERIVATIVES
Shigeo Senda, Gifu, Harime Fujimura, Kyoto, and Hiroshi Izumi, Gifu, Japan, assignors to Takeda Chemical Industries, Ltd., Osaka, Japan
No Drawing. Filed Feb. 23, 1965, Ser. No. 434,648
6 Claims. (Cl. 260—257)

This invention relates to novel compounds useful as anti-inflammatory agents and to anti-inflammatory compositions comprising any of said compounds as active ingredient. More concretely stated, the invention is concerned with a series of 1,5-disubstituted barbituric acids and their salts, the series having superior anti-inflammatory activity and being of less toxicity than hitherto-known 1,5-disubstituted barbituric acids, and with anti-inflammatory compositions containing an effective amount of any of said novel barbituric acid derivatives.

We, previously, completed the invention of the new compounds, 5-substituted 1-cyclohexyl (or 1,3-dicyclohexyl) barbituric acids and their salts, which are not only very effective in anti-inflammatory activity but have far less side-effects than those observed in known anti-inflammatory agents such as adrenocortical hormones (e.g., prednisolone, triamcinolone, or the like), pyrazolidine derivatives (e.g., phenylbutazone, oxyphenbutazone, 1,4-diphenyl-3,5-dioxopyrazolidine, or the like).

Our further studies on this series of compounds have led us to the invention concerning the new 1,5-disubstituted barbituric acids showing by the following general Formula I:

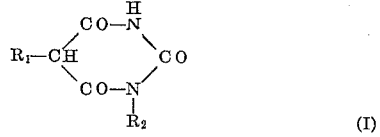

(I)

where $R_1$ stands for a hydrocarbon residue having up to six carbon atoms, and $R_2$ stands for cyclopentyl, hydroxycyclohexyl or lower carboxylic acyloxy cyclohexyl radical.

These new compounds are not only as effective as 5-substituted 1-cyclohexyl (or 1,3-dicyclohexyl) barbituric acids mentioned above in anti-inflammatory activity but also have less side-effects (e.g., toxicity) than those.

Otherwise stated, the present invention embodies a group of novel and useful barbituric acid derivatives as a new-type of non-steroidal anti-inflammatory agents. It also provides pharmaceutical compositions which comprise at least one of the aforesaid novel barbituric acid derivatives, said compositions being used for the therapy of a variety of inflammations and having higher activity than the known non-steroidal anti-inflammatory compositions and with substantially no side-effect.

The new compounds (I) can be prepared in a variety of ways:

(A) A malonic acid derivative represented by the Formula II is allowed to react with a corresponding urea derivative:

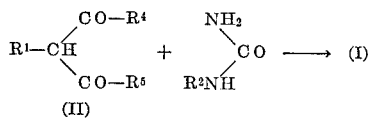

(II)

where $R^1$ and $R^2$ have the same significances as in the Formula I, and $R^4$ and $R^5$ are respectively a hydroxyl, an alkoxy, an aryloxy, or an aralkyloxy group or a halogen atom.

In the reaction of this procedure (A), when a malonic acid ester derivative is used as a starting material, the reaction is brought about desirably in the presence of a condensation catalyst. The reaction is usually accelerated by heating. As the solvent for the reaction, there is usually employed a lower aliphatic alcohol, but there can be employed solvents other than lower aliphatic alcohols so long as they do not disturb the course of the reaction. It is in any event desired that the solvent be as anhydrous as possible.

When the malonic acid derivative is an acid halide, acid, i.e., $R^4$ and $R^5$ are both hydroxyl groups, the reaction can be accelerated by heating a mixture of both starting materials in the presence of a dehydrating agent for condensation. This reaction may be carried out without solvent. However, if desired, an anhydrous organic solvent may be used as long as it does not disturb the course of reaction.

When the malonic acid derivative is an acid halide, i.e., $R^4$ and $R^5$ are both halide atoms, the reaction takes place with generation of hydrogen halide. However, it is generally preferable to accelerate the reaction with heating. Solvent is usually unnecessary for this reaction, too, but, if desired, an anhydrous organic solvent may be used. Moreover, the reaction may be accelerated by adding as an acid acceptor an inorganic base or an organic base.

(B) A corresponding urea derivative is allowed to react with a cyanoacetic acid derivative represented by Formula III to give an imide of a barbituric acid represented by Formula IV, followed by hydrolysis to obtain the objective barbituric acid derivative I:

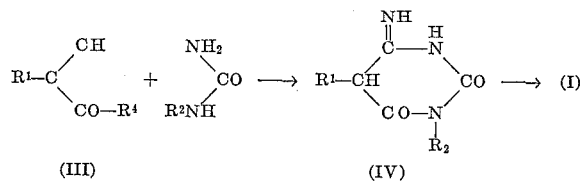

(III) (IV)

where $R^1$ and $R^2$ have the same meaning as in Formula I and $R^4$ is a halogen atom, a hydroxyl, an alkoxy, an aryloxy or an aralkyloxy group.

Otherwise stated in the reaction of this procedure (B), when a cyanoacetic acid ester derivative is used as a starting material, the reaction is carried out desirably in the presence of a condensation catalyst.

When the cyanoacetic acid derivative is a free carboxylic acid, i.e. $R^4$ is a hydroxyl group, the reaction is accelerated by heating a mixture of both starting materials in the presence of a dehydrating agent for condensation.

When the cyanoacetic acid derivative is an acid halide, i.e. $R^4$ is a halogen atom such as chlorine or bromine, the reaction takes place with generation of hydrogen halide. However, it is generally preferable to accelerate the reaction with heating. Moreover, the reaction may be accelerated by adding as an acid acceptor an inorganic base or an organic base.

The so-obtained imide compound of the Formula IV is then hydrolyzed by acid hydrolysis. The reaction is brought about by heating the imide derivative in an aqueous medium containing an acid catalyst or any chemical equivalent thereof. Of course, the hydrolysis can be effected by the use of strongly acid cation exchange resins for the same purpose.

(C) An ureide of malonic acid derivatives which is represented by Formula VII is treated with alkaline agent to form the objective compound I by intramolecular ring-closure:

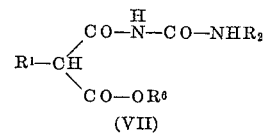

(VII)

where $R^1$ and $R^2$ have the same meanings as in Formula I, and $R^6$ is a hydrocarbon residue such as an alkyl (e.g. methyl, ethyl, propyl, butyl, decyl, myristyl, etc.), an aryl (e.g. phenyl, toluyl, etc.) or an aralkyl (e.g. benzyl, phenethyl, etc.) residue. The reaction is accelerated by the presence of an alkaline agent such as sodium hydroxide, potassium hydroxide, sodium carbonate, potassium carbonate, barium hydroxide, trisodium phosphate, sodium methylate, sodium ethylate, or any chemical equivalent thereof, and the reaction may take place at room temperature, but is accelerated by suitably heating the reaction mixture.

As the alkaline agent is usually employed in the form of an aqueous solution, it is not necessary to employ any other solvent for the reaction, but a suitable solvent which does not disturb the reaction may be used, depending on the circumstances. Upon completion of the reaction, the reaction mixture is weakly acidified with an acid such as hydrochloric acid, hydrobromic acid, sulfuric acid, acetic acid, or chemical equivalent thereof, with cooling if desired, and then the objective compound can be separated out of the solution.

(D) A malonic acid monoamide derivative represented by the Formula VIII is allowed to react with a carbamic acid derivative represented by the Formula IX:

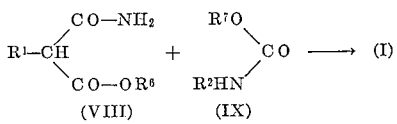

(VIII)    (IX)

wherein $R^1$ and $R^2$ have the same meanings as in Formula I, and $R^6$ and $R^7$ are respectively a hydrocarbon residue such as an alkyl (e.g. methyl, ethyl, propyl, butyl, decyl, myristyl, etc.), an aryl (e.g. phenyl, toluyl, etc.) or an aralkyl (e.g. benzyl, phenethyl, etc.) residue.

As the malonic acid amide derivative, it is desirable to use an amide of malonic esters, especially that of the lower alkyl ester, though amides of the higher alkyl esters, of the aryl esters or of the aralkyl esters can be used for the same purpose. The reaction is accelerated by the presence of an alkaline agent such as sodium methylate, sodium ethylate, potassium methylate, potassium ethylate, sodium amide, metallic sodium, metallic potassium or any chemical equivalent thereof. Usually, heating is desirable to allow the reaction to take place smoothly.

As the solvent for the reaction, alcohols such as methanol, ethanol, propanol and butanol are usually employed, but any organic solvent generally used can also be employed so long as it does not disturb the course of the reaction.

(E) Corresponding mono-substituted amine is allowed to react with an ester of a malonic acid amide derivative or an ester of a malonic acid amide derivative, both esters being represented by the Formula X, to allow the reaction of the following equation to take place:

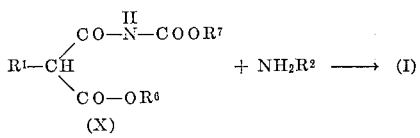

(X)

where $R^1$ and $R^2$ have the same meanings as in Formula I, and $R^6$ and $R^7$ are respectively a hydrocarbon residue such as a lower alkyl, an aryl or an aralkyl.

(F) An aldehyde or a ketone, both having up to six carbon atoms, is allowed to react with 1-substituted barbituric acid to form a 5-alkylidene-1-substituted barbituric acid represented by the Formula XI, and the intermediate is reduced to give the objective compound I:

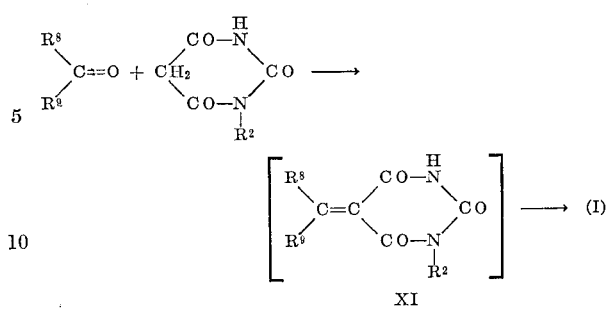

XI where $R^2$ has the same meanings as in Formula I, and $R^8$ and $R^9$ are respectively a hydrogen or a lower alkyl, or jointly stand for cycloalkyl, and the total of carbon atoms of $R^8$ and $R^9$ is not more than five.

1-substituted barbituric acid can be prepared, for example, (1) by the condensation reaction between malonic acid or its reactive derivative (e.g. acid chloride, acid bromide, methyl ester, ethyl ester or the like) and corresponding mono-substituted urea, (2) by a reaction between an ester of malonic acid N-mono-substituted diamide and phosgene or carbonyl bromide, or by other means similar to the process for producing known barbituric acids.

As the aldehyde to be used as the starting material, there may be mentioned, for example, formaldehyde, acetaldehyde, propylaldehyde, acrolein, butylaldehyde, 2-methylpropanal, amylaldehyde, 2(or 3)-methylpentanal, 2,2-dimethylpropanal, hexylaldehyde, 2(or 3 or 4)-methylpentanal, 2,2(or 3,3)-dimethylbutanal, 2(or 3)-ethylpropanal, etc., and the ketone can be exemplified by acetone, methyl ethyl ketone, diethyl ketone, vinyl ethyl ketone, ethyl propyl ketone, ethyl isopropenyl ketone, cyclohexanone, cyclopentanone, cyclohex-2(or 3)-enone, cyclopent-2(or 3)-enone, etc.

As stated above, this procedure (F) for the production of the objective compounds I consists of condensation and hydrogenation (or reduction) reactions. These reactions can be carried out simultaneously or in the order of reduction after condensation.

When it is intended to carry out both reactions simultaneously, i.e. in one step, the aldehyde or ketone should be allowed to react with corresponding 1-mono-substituted barbituric acid under reducing conditions, which can be realized by adding a reducing agent to the reaction system or by introducing hydrogen gas to the reaction medium in the presence of a suitable catalyst.

The reducing agent can be selected from generally known reducing agents which are exemplified by a metal and an acid (the metal being tin, iron, zinc-amalgam, etc. and the acid being hydrochloric acid, acetic acid, sulfuric acid, etc.), a metal and an alcohol (the metal being sodium, lithium, aluminium-amalgam, zinc, etc. and the alcohol being methanol, ethanol, etc.), a metal such as sodium sodium-amalgam, magnesium, magnesium-amalgam, aluminium-amalgam, zinc, iron, etc., a metal and an alkali (the metal being aluminium, zinc, etc. and the alkali being sodium hydroxide, potassium hydroxide, etc.) as well as stannous chloride, ferrous chloride, complex metal hydride and any chemical equivalent thereof.

The catalyst for the catalytic reduction can be exemplified by those of the platinum series (e.g. platinum sponge, platinum black, platinum plate, platinum oxide, colloidal platinum, etc.), those of the palladium series (e.g. colloidal palladium, palladium sponge, palladium black, etc.), those of the nickel series (e.g. reduced nickel, nickel oxide, Raney nickel, Urushibara nickel, etc.), and other metals or metal compounds belonging to the cobalt series, copper series, iron series, molybdenum series, tungsten series, zinc series, or the like, those consisting of two or more of the above-mentioned metals and/or metal compounds (i.e. binary catalysts, multiple catalysts or alloy catalysts) and those of the above-mentioned catalysts supported on a carrier such as diatomaceous earth, clay, active carbon, silica, alumina, asbestos or the like. Although, theoretically stated, one mole of hydrogen per mole of the starting barbituric acid derivative is absorbed during the reaction, an excess amount of hydrogen may be conducted into the reaction system.

A solvent for the reaction is suitably selected in accordance with the means for reduction, and as the solvent there are usually employed alcohols such as methanol, ethanol, etc., ethers such as ether, dioxane, tetrahydrofuran, etc., carboxylic acid esters such as methyl acetate, ethyl acetate, etc., but any solvents used for chemical reactions may be employed so long as they do not disturb the reaction. The reaction may be carried out at room temperature or under heating. The reaction can be carried out at atmospheric pressure, but it may be carried out at an elevated pressure, if desired. Moreover, the reaction, especially the condensation, may be accelerated by the addition of (G) 1-mono-substituted barbituric acid is alkylated by an alkylating agent such as an alkyl halide, an alkyl sulfate, an alkyl benzene sulfonate, an alkyl toluenesulfonate, etc., the object being to introduce the alkyl moiety thereof into position 5 of the starting barbituric acid derivatives:

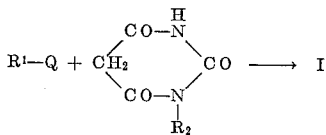

where $R^1$ and $R^2$ have the same meanings as in Formula I, and Q is a halogen atom such as chlorine, bromine and iodine, an equivalent of $SO_4$, a sulfonyloxy such as benzenesulfonyloxy, toluenesulfonyloxy, methanesulfonyloxy, etc.

The objective barbituric acid derivatives I may be isolated in the free acid form or in the form of a salt such as the sodium, potassium, ammonium, calcium, magnesium, or the like salts. Either form is easily convertible to the other form. For example, the free acid is changed into a desired salt thereof by adding the former to an alcoholic or aqueous medium containing approximately the equivalent amount of the base desired to form the salt, and by concentrating the mixture and/or allowing the same to cool on standing. On the other hand, a salt can be changed into the free acid in manner per se well-known, that is, by neutralizing the former with an acid such as hydrochloric acid, hydrobromic acid, sulfuric acid, cation-exchange resins, etc. Commercially available cation-exchange resins for the process of the present invention include, for example, Amberlite IR–120 (Rohm & Haas Co., Inc., U.S.A.), Dowex 50 (Dow Chemical Co., Inc., U.S.A.), Permutit Q (Permutit Co., Inc., U.S.A.) and Daiaion SK No. 1 (Mitsubishi Chemical Industries, Ltd., Japan).

Thus produced objective compounds of the Formula I, which are novel and useful as anti-inflammatory agents, include:

1-cyclopentyl-5-benzyl-barbituric acid
1-(4'-hydroxycyclohexyl)-5-methyl-barbituric acid
1-(4'-hydroxycyclohexyl)-5-n-butyl-barbituric acid
1-(4'-hydroxycyclohexyl)-5-sec-butyl-barbituric acid
1-(4'-hydroxycyclohexyl)-5-tert-butyl-barbituric acid
1-(4'-hydroxycyclohexyl)-5-allyl-barbituric acid
1-(4'-hydroxycyclohexyl)-5-propyl-barbituric acid
1-(4'-hydroxycyclohexyl)-5-isopropyl-barbituric acid
1-(4'-hydroxycyclohexyl)-5-cyclohexyl-barbituric acid
1-(4'-hydroxycyclohexyl)-5-phenyl-barbituric acid
1-(4'-hydroxycyclohexyl)-5-benzyl-barbituric acid
1-(4'-acetyloxycyclohexyl)-5-methyl-barbituric acid
1-(4'-acetyloxycyclohexyl)-5-n-butyl-barbituric acid
1-(4'-acetyloxycyclohexyl)-5-sec-butyl-barbituric acid
1-(4'-acetyloxycyclohexyl)-5-tert-butyl-barbituric acid
1-(4'-acetyloxycyclohexyl)-5-allyl-barbituric acid
1-(4'-acetyloxycyclohexyl)-5-propyl-barbituric acid
1-(4'-acetyloxycyclohexyl)-5-isopropyl-barbituric acid
1-(4'-acetyloxycyclohexyl)-5-cyclohexyl-barbituric acid
1-(4'-acetyloxycyclohexyl)-5-phenyl-barbituric acid
1-(4'-acetyloxycyclohexyl)-5-benzyl-barbituric acid
1-(4'-propionyloxycyclohexyl)-5-methyl-barbituric acid
1-(4'-propionyloxycyclohexyl)-5-n-butyl-barbituric acid
1-(4'-propionyloxycyclohexyl)-5-sec-butyl-barbituric acid
1-(4'-propionyloxycyclohexyl)-5-tert-butyl-barbituric acid
1-(4'-propionyloxycyclohexyl)-5-allyl-barbituric acid
1-(4'-propionyloxycyclohexyl)-5-propyl-barbituric acid
1-(4'-propionyloxycyclohexyl)-5-isopropyl-barbituric acid
1-(4'-propionyloxycyclohexyl)-5-cyclohexyl-barbituric acid
1-(4'-propionyloxycyclohexyl)-5-phenyl-barbituric acid
1-(4'-propionyloxycyclohexyl)-5-benzyl-barbituric acid
1-(4'-butyroyloxycyclohexyl)-5-methyl-barbituric acid
1-(4'-butyroyloxycyclohexyl)-5-n-butyl-barbituric acid
1-(4'-butyroyloxycyclohexyl)-5-sec-butyl-barbituric acid
1-(4'-butyroyloxycyclohexyl)-5-tert-butyl-barbituric acid
1-(4'-butyroyloxycyclohexyl)-5-allyl-barbituric acid
1-(4'-butyroyloxycyclohexyl)-5-propyl-barbituric acid
1-(4'-butyroyloxycyclohexyl)-5-isopropyl-barbituric acid
1-(4'-butyroyloxycyclohexyl)-5-cyclohexyl-barbituric acid
1-(4'-butyroyloxycyclohexyl)-5-phenyl-barbituric acid
1-(4'-butyroyloxycyclohexyl)-5-benzyl-barbituric acid
1-(4'-benzoyloxycyclohexyl)-5-methyl-barbituric acid
1-(4'-benzoyloxycyclohexyl)-5-n-butyl-barbituric acid
1-(4'-benzoyloxycyclohexyl)-5-sec-butyl-barbituric acid
1-(4'-benzoyloxycyclohexyl)-5-tert-butyl-barbituric acid
1-(4'-benzoyloxycyclohexyl)-5-allyl-barbituric acid
1-(4'-benzoyloxycyclohexyl)-5-propyl-barbituric acid
1-(4'-benzoyloxycyclohexyl)-5-isopropyl-barbituric acid
1-(4'-benzoyloxycyclohexyl)-5-cyclohexyl-barbituric acid
1-(4'-benzoyloxycyclohexyl)-5-phenyl-barbituric acid
1-(4'-benzoyloxycyclohexyl)-5-benzyl-barbituric acid
1-cyclopentyl-5-methyl-barbituric acid
1-cyclopentyl-5-n-butyl-barbituric acid
1-cyclopentyl-5-sec-butyl-barbituric acid
1-cyclopentyl-5-tert-butyl-barbituric acid
1-cyclopentyl-5-allyl-barbituric acid
1-cyclopentyl-5-propyl-barbituric acid
1-cyclopentyl-5-isopropyl-barbituric acid
1-cyclopentyl-5-cyclohexyl-barbituric acid
1-cyclopentyl-5-phenyl-barbituric acid The active compounds of the present invention may be administered alone or in combination with pharmaceutically acceptable carriers or may be administered together with aminopyrine or a steroidal anti-inflammatory agent with or without any other pharmaceutically acceptable carriers, the compounds being in any case administrable as powders, tablets, solutions, emulsions, etc. for oral administration or as injections, suppositories, etc. for non-oral administration. The choice of the carrier is determined by the preferred route of administration, the solubility of the compound and standard pharmaceutical practice. In general, the dosage of these compounds of the invention is approximately of a magnitude of about 7.5 to about 150 milligrams per kilogram of body weight per day. Because of their great anti-inflammatory activity and their low toxicity it is sometimes possible to use dosages of these compounds of greater or less magnitude than that indicated. Especially when these compounds are used together with other anti-inflammatory agents as mentioned above, the dosage may be lessened in accordance with the magnitude of the synergic effect between them.

The following examples are solely for the purpose of illustration and are not to be construed as limitations of this invention, many variations being possible without departing from the spirit or scope of this invention. In the examples as well as in the foregoing description, "mg.," "g.," "kg." and "cc." are abbreviations of milligram(s), gram(s), kilogram(s) and cubic centimeter(s), respectively, and temperatures are all uncorrected. The objective compounds of the respective examples have been confirmed by means of elementary analyses.

Example 1

A mixture of 8.0 g. of n-butylmalonic acid and 22.9 g. of phosphorus pentachloride was heated on water bath for 1.5 hours and the reaction mixture was allowed to stand to cool. About 50 cc. of chloroform and 7.9 g. of 4′-hydroxycyclohexylurea were added to the cooled mixture and the resultant mixture was refluxed for 4 hours. After the reaction, chloroform and phosphoryl chloride were distilled off. The residue was washed with cold water and dissolved in about 200 cc. of 10% aqueous sodium hydroxide solution under stirring, followed by the addition of about 1 liter of water. The diluted solution was treated with active carbon at room temperature, and filtered. The filtrate was neutralized with concentrated hydrochloric acid to make its pH weakly acid, whereupon precipitates separated, which were collected by filtration, washed with water and recrystallized from methanol to give 1-(4′-hydroxycyclohexyl)-5-n-butylbarbituric acid melting at 218° C. Yield 4.5 g.

Example 2

In 200 cc. of absolute alcohol was dissolved 4.6 g. of metallic sodium and 43 g. of diethyl n-butylmalonate and 34 g. of 4-hydroxycyclohexylurea were added to the sodium ethylate solution. The mixture was refluxed for 7 hours. After the reaction, ethanol was distilled off and the residue was dissolved in 200 cc. of water. The aqueous solution was treated with active carbon at room temperature and filtered. The filtrate was acidified with hydrochloric acid to give precipitates, which were collected by filtration and recrystallized from methanol to give 1-(4′-hydroxycyclohexyl)-5-n-butylbarbituric acid melting at 218°. Yield 28 g.

Example 3

A mixture of 6.4 g. of cyclopentylurea, 150 cc. of chloroform and 10.8 g. of butylmalonic acid dichloride was heated on water bath for 4 hours. After the reaction, chloroform was distilled off, and the residue was washed with water and extracted with benzene. The benzene extract was concentrated to remove benzene. A solution prepared from 70 cc. of ethanol and 1.6 g. of metallic sodium was added to the residue and ethanol was distilled off. The residue was dissolved in 200 cc. of water, and the aqueous solution was treated with active carbon at room temperature and filtered. The filtrate was weakly acidified with hydrochloric acid to give crude oily substance, which was distilled to give 1-cyclopentyl-5-n-butylbarbituric acid as colorless oily substance boiling at 180° C. under 0.3 mm. Hg. Yield 7.85 g.

A mixture of 30 cc. of dehydrated ethanol and 0.46 g. of metallic sodium is dissolved in 5 g. of thus obtained oily 1-cyclopentyl-5-n-butylbarbituric acid. The solution is slowly added with dehydrated ethyl ether under heating until the solution becomes cloudy. After cooling, a precipitated solid is separated out, and dried in vacuo to give sodium 1-cyclopentyl-5-n-butylbarbiturate as colorless crystal. Yield 4.0 g.

Example 4

To an ethanolic sodium ethylate solution which was prepared by dissolving 1.2 g. of metallic sodium in 60 cc. of absolute ethanol were added 6.4 g. of ethyl α-cyanopropionate and 6.4 g. of cyclopentylurea, and the mixture was heated under reflux on a water bath for 8 hours. 30% acetic acid was added to the reaction mixture to adjust the pH of the mixture to weakly acid and the solvent was evaporated to leave crude intermediate. To the residue was added 50 cc. of 30% sulfuric acid, and the mixture was heated under reflux for 3 hours and was allowed to stand to separate oily substance, which was extracted with benzene. The benzene solution was evaporated to leave as a residue which was then distilled to give 1-cyclopentyl-5-methylbarbituric acid as colorless oily substance boiling at 150 to 160° C. under 0.5 mm. Hg. Yield 6.5 g.

Example 5

A mixture of 21 g. of allylmalonic acid, N-cyclopentyldiamide and 240 g. of 5% solution of phosgene in benzene was heated in a sealed tube at 100° C. for 7 hours. After the reaction, benzene was completely distilled off. To the residue was added 100 cc. of water, and the mixture was thoroughly stirred and washed with water. The so-obtained solution was mixed with an ethanolic sodium ethylate solution prepared from 2.3 g. of metallic sodium and 150 cc. of ethanol. Then, ethanol was distilled off under reduced pressure to leave a residue, which was dissolved in 200 cc. of water. The aqueous solution was treated with active carbon at room temperature to give, as a filtrate, 1-cyclopentyl-5-allylbarbituric acid as colorless oily substance boiling at 172° C. under 0.5 mm. Hg. Yield 6.1 g.

Example 6

A mixture of 10.3 g. of n-butylmalonic acid chloride ethyl ester, 7.9 g. of 4-hydroxycyclohexylurea and 50 cc. of chloroform was heated under reflux on water bath for 4 hours. After the reaction, the reaction mixture was washed with water, and dried over anhydrous potassium carbonate. The chloroform solution was concentrated to dryness and an ethanolic sodium ethylate solution prepared from 1.2 g. of metallic sodium and 60 cc. of absolute ethanol was added to the residue. The mixture was heated under reflux for 8 hours. After the reaction, ethanol was distilled off and the residue was dissolved in 150 cc. of water. The aqueous solution was treated with active carbon at room temperature and acidified with hydrochloric acid to give crystals, which were filtered and recrystallized from methanol to obtain 2.2 g. of 1-(4′-hydroxycyclohexyl) - 5 - n-butylbarbituric acid melting at 218° C.

Example 7

Hydrogen was introduced into a solution of 5.4 g. of 1-(4′-acetyloxycyclohexyl)barbituric acid, 1.7 g. of butyl aldehyde and a few drops of pyridine in 100 cc. of glacial acetic acid in the presence of 10% palladium-carbon under shaking. The theoretical amount of hydrogen was consumed for about 2 hours. The catalyst was filtered off and the filtrate was concentrated under reduced pressure. The resulting residue was washed with water and recrystallized from methanol to give 1-(4′-acetyloxycyclohexyl)-5-n-butylbarbituric acid melting at 126° C. Yield 3.0 g.

Example 8

After a mixture of 4.5 g. of 1-(4′-hydroxycyclohexyl)barbituric acid and 1.7 g. of butyl aldehyde was allowed to stand for 2 hours at room temperature, a mixture of 100 cc. of concentrated hydrochloric acid and 100 cc. of ethanol was added to the mixture, followed by the addition of about 30 g. of stannous chloride. The whole mixture was heated for 3 hours and the ethanol was distilled off. The residue was diluted with water and the aqueous solution was adjusted to weakly acid with aqueous sodium hydroxide solution under cooling and stirring. The so-adjusted solution was extracted with chloroform. The chloroform extract was washed with water and the chloroform was distilled off. The residue was recrystallized from methanol to obtain 1.2 g. of 1-(4′-hydroxycyclohexyl)-5-n-butylbarbituric acid melting at 128° C.

Example 9

In a mixture of 60 cc. of water and 60 cc. of ethanol was dissolved 14.7 g. of 1-cyclopentylbarbituric acid under warming. To the solution were added 10.2 g. of sodium acetate and a mixture of 10.7 g. of butyl bromide, 3.8 cc. of water and 90 cc. of ethanol, and the resulting mixture was refluxed on a water bath for 8 hours. Upon completion of the reaction, the reaction mixture was concentrated under reduced pressure. The residue was washed with water and extracted with hot ligroin. The ligroin extract was allowed to stand for cooling, and filtered. The filtrate was concentrated and the residue was distilled under reduced pressure to give 4.1 g. of 1-cyclopentyl-5-n-butylbarbituric acid as colorless oily substance boiling at 180° C./0.5 mm. Hg.

*Example 10*

In 100 cc. of butanol was dissolved 1.2 g. of sodium, followed by the addition of 9.8 g. of 1-cyclopentyl-barbituric acid. The mixture was warmed to dissolve the starting material, and to the solution was added 6.1 g. of allyl bromide. The mixture was refluxed for 5 hours. After the reaction, butanol was distilled off, and the residue was washed with water and dissolved in hot ligroin. The ligroin solution was allowed to stand, filtered and concentrated. The residue was distilled in vacuo to give 3.2 g. of 1-cyclopentyl-5-allylbarbituric acid as colorless oily substance boiling at 172° C./0.5 mm. Hg.

*Example 11*

A mixture of 8.0 g. of n-butylmalonic acid, 10 g. of 4-acetoxycyclohexylurea, 15 ml. of glacial acetic acid and 30 ml. of acetic anhydride is heated on a water bath for 6 hours to allow the reaction to take place. The reaction mixture is concentrated in vacuo. The resulting residue is warmed with 50 ml. of water for a short period, followed by cooling to give precipitates.

The precipitates are collected by filtration and recrystallized from methanol to yield 1-(4'-acetoxycyclohexyl)-5-n-butylbarbituric acid melting at 126° C. Yield 2.9 g.

*Example 12*

In a solution of 2 g. of sodium hydroxide in 100 cc. of water was dissolved 9.1 g. of 1-(4'-hydroxycyclohexyl)-barbituric acid. To the solution was gradually dropped a mixture of 6 g. of n-butylbromide and 100 cc. of methanol under stirring. After reaction for 3 hours at room temperature, the reaction mixture was heated at about 60° C. for additional 3 hours, and was extracted with chloroform. The chloroform extract was washed with water, concentrated under reduced pressure to leave a residue, which was repeatedly recrystallized from methanol to give 1-(4'-hydroxycyclohexyl)-5-n-butylbarbituric acid melting at 218° C. Yield 1.7 g.

*Example 13*

The same procedures as in the preceding examples were repeated to obtain the compounds listed below, which are all novel and useful and fall within the scope of the general Formula I:

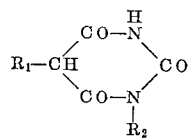

(I)

| $R_1$ | $R_2$ | Melting Point (° C.) unless otherwise noted | Procedure of preparation |
|---|---|---|---|
| $CH_3-(CH_2)_3-$ | HO—⟨H⟩— | 218 | A, B, C, F, G |
| $CH_3-(CH_2)_3-$ | $CH_3OCO$—⟨H⟩— | 126 | A, B, C, F, G |
| $CH_3-$ | ⟨H⟩— | Boiling point 150–160° C./0.5 mm. Hg | A, B, D, E |
| $CH_2=CH-CH_2-$ | ⟨H⟩— | Boiling Point 172° C./0.5 mm. Hg | A, G |
| $CH_3-(CH_2)_3-$ | ⟨H⟩— | Boiling Point 180° C./0.5 mm. Hg | A, B, G |
| $CH_3-$ | HO—⟨H⟩— | | A, B, C, F, G |
| $CH_2=CH-CH_2-$ | HO—⟨H⟩— | | A, B, C, F, G |
| $CH_3-(CH_2)_4-$ | HO—⟨H⟩— | | A, B, C, F, G |

The present inventors found interesting facts with regard to the novel barbituric acid derivatives thus produced, especially in their physiological activities and their physiochemical properties.

(1) One of the characteristics of the compounds (I) is in their low toxicity as shown by the following experiments.

Tragacanth emulsion of each test compound was administered intraperitoneally to mice (dd-strain) weighing 14 to 15 grams, and $LD_{50}$ and 95%-confidence limits were calculated by Litchfield-Wilcoxon method on the basis of the number of mice that died during 24 hours after the administration. The result is shown in Table 1, from which it can be concluded that the compounds of this invention are significantly less toxic than not only phenylbutazone or aminopyrine, but also corresponding 1-cyclohexyl-5-substituted barbituric acid derivatives.

TABLE 1

| Test compound | $LD_{50}$ (95% C.L.) mg./10 g. in mice Intraperitoneally |
|---|---|
| 1-(4'-Hydroxycyclohexyl)-5-n-butylbarbituric acid | 23 0 (21.9–24.2) |
| 1-(4'-Acetoxycyclohexyl)-5-n-butylbarbituric acid | 23 6 (22.2–25.0) |
| 1-Cyclopentyl-5-allyl-barbituric acid | 6 30 (5.87–6.74) |
| 1-Cyclohexyl-5-n-butyl-barbituric acid | 3 31 (2 83–3.81) |
| 1-Cyclohexyl-5-allyl-barbituric acid | 3 88 (3.53–4.26) |
| Phenylbutazone | 2 20 (1.94–2.49) |
| Aminopyrine | 2.69 (2.50–2.82) |

(2) It was also found by the present inventors that the compounds I have an outstanding anti-inflammatory effect.

Each 100 milligrams or 200 milligrams per kilogram of test compounds was injected intraperitoneally to male rats (Wister-strain) weighing 130 to 180 grams. After 30 minutes from the injection, these rats as well as those for control were injected subcutaneously through hind paw 0.5 cc. of 6% aqueous dextran solution, or 0.1 cc. of 10% aqueous ovalbumin solution, hyaluronidase solution or serotonin solution as substances to provoke inflammatory edema, and the percentages of the maximum inhibition of the edema relative to the control were measured with regard to each test compound. The result is shown in Table 2, from which it is observed that the compounds of the present invention as well as the corresponding 1-cyclohexyl-5-substituted barbituric acids show anti-inflammatory action superior to phenylbutazone and even those having the worst activity among the compounds I show inhibitory action not less than that of phenylbutazone.

What is claimed is:

1. A member selected from the group consisting of compounds of the formula

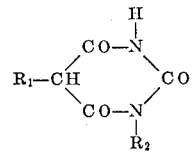

and the alkali metal salts and alkaline earth metal salts thereof, wherein $R_1$ is alkyl with a maximum of six carbon atoms or allyl, and $R_2$ is a member selected from the group consisting of hydroxycyclohexyl, lower alkylcarbonyloxycyclohexyl and benzoyloxycyclohexyl.

2. 1-(4'-hydroxycyclohexyl)-5-methylbarbituric acid.
3. 1-(4'-hydroxycyclohexyl)-5-butylbarbituric acid.
4. 1-(4'-hydroxycyclohexyl)-5-amylbarbituric acid.
5. 1-(4'-hydroxycyclohexyl)-5-allylbarbituric acid.
6. 1-(4'-acetyloxycyclohexyl)-5-butylbarbituric acid.

TABLE 2

| Test compound | Dextran | Ovalbumin | Hyaluronidase | Serotonin |
|---|---|---|---|---|
| 1-(4'-Hydroxycyclohexyl)-5-n-butylbarbituric acid | +1, +2, *+1, *+2 | +2, *+3, *+4, *+4 | *+4 | *+3 |
| 1-(4'-Acetoxycyclohexyl)-5-n-butylbarbituric acid | +1, +2, *+3 | +2, *+4 | *+4 | *+4 |
| 1-Cyclopentyl-5-allyl-barbituric acid | +2 | +2 | – | – |
| 1-Cyclohexyl-5-n-butyl-barbituric acid | +3, +3 | +2, +3, +3 | +4 | +2 |
| 1-Cyclohexyl-5-allyl-barbituric acid | +2, +3 | +4 | – | – |
| Phenylbutazone | +1, +2 | – | – | – |
| Aminopyrine | +1 | – | – | – |

REMARKS: –, was not tested; +1, 15–25% inhibition; +2, 26–50% inhibition; +3, 51–65% inhibition; +4, inhibition higher than 65%; *, 200 mg. injected; others 100 mg. injected.

References Cited

UNITED STATES PATENTS 2,206,779   7/1940   Kropp et al. ......... 260—257
2,446,504   8/1948   Wenner ............. 260—257

ALEX MAZEL, *Primary Examiner.*

MARY U. O'BRIEN, *Assistant Examiner.*